(12) United States Patent  (10) Patent No.: US 7,660,102 B2
Brütsch  (45) Date of Patent: Feb. 9, 2010

(54) BUS BAR BLOCK (75) Inventor: Friedbert Brütsch, Tuttlingen (DE)

(73) Assignee: Friedrich Gohringer Elektrotechnik GmbH, Triberg (DE)

( * ) Notice: Subject to any disclaimer, the term of this patent is extended or adjusted under 35 U.S.C. 154(b) by 161 days.

(21) Appl. No.: 12/072,081

(22) Filed: Feb. 22, 2008

(65) Prior Publication Data

US 2009/0109606 A1 Apr. 30, 2009

(30) Foreign Application Priority Data

Oct. 26, 2007 (DE) .................. 10 2007 051 647

(51) Int. Cl.
H02B 1/20 (2006.01)
(52) U.S. Cl. ............... 361/648; 361/622; 361/624; 361/650; 307/147
(58) Field of Classification Search ............ 361/611, 361/614, 622, 624, 627, 637, 639–641, 648, 361/650, 652, 655, 657–658, 673; 307/147
See application file for complete search history.

(56) References Cited

U.S. PATENT DOCUMENTS

| | | | | |
|---|---|---|---|---|
| 4,167,768 | A * | 9/1979 | Baker et al. ............... | 361/638 |
| 5,094,626 | A * | 3/1992 | Fabrizi et al. ............. | 439/511 |
| 7,102,256 | B2 * | 9/2006 | Murakami ................. | 307/147 |
| 7,449,645 | B1 * | 11/2008 | Flegel ....................... | 200/51.11 |
| 2008/0030930 | A1 * | 2/2008 | Adunka et al. ............ | 361/611 |

FOREIGN PATENT DOCUMENTS

| | | | | |
|---|---|---|---|---|
| DE | 42 05 262 | C1 | | 5/1993 |
| DE | 103 32 679 | A1 | | 3/2005 |
| DE | 202008002352 | U1 | * | 6/2008 |
| EP | 43931 | A2 | * | 1/1982 |
| EP | 112232 | A1 | * | 6/1984 |
| EP | 891026 | A1 | * | 1/1999 |
| GB | 2129222 | A | * | 5/1984 |
| JP | 2002135912 | A | * | 5/2002 |
| JP | 2003274520 | A | * | 9/2003 |

* cited by examiner

Primary Examiner—Jayprakash N Gandhi
Assistant Examiner—Robert J Hoffberg
(74) Attorney, Agent, or Firm—Mark A. Garzia, P.C.; Law Offices of Mark A. Garzia, P.C.

(57) ABSTRACT

The invention relates to a bus bar block with a first bus bar and a second bus bar, each of which has an insulating enclosure, which is at least partially open on one side across from the base side, with, in each enclosure, at least one terminal bar being arranged on which several terminal lugs are arranged such that they protrude from the enclosure in sections through the at least partially open side, with the two bus bars being arranged on a holding device such that their base areas are facing each other, with the holding device for each terminal bar of one of the two bus bars having an electro-conductive connection element, which is designed such that it can be connected with a first end section using one of the terminal lugs of a terminal bar of the first bus bar and with a second end section using one of the terminal lugs of a terminal bar of the second bus bar and such that it makes a connection to a connection contact.

31 Claims, 9 Drawing Sheets

BUS BAR BLOCK

CROSS-REFERENCE TO RELATED APPLICATIONS

This application claims priority to German Patent Application No. 10 2007 051 647.0 filed Oct. 26, 2007, titled BUS BAR BLOCK, applied for in the name of Friedrich Göhringer Elektrotechnik GmbH

BACKGROUND OF THE INVENTION

This invention relates to a bus bar block

Bus bars for the horizontal assembly are known, which have at least one terminal bar arranged on an insulating enclosure that is at least partially open on one side, on one side of which several terminal lugs are arranged that protrude from the partially opened side of the insulating enclosure. These bus bars are mounted such that the partially opened side faces upwards and connecting machines can be placed facing up on the bus bar.

Also known are bus bars that can be assembled vertically, which have at least one terminal bar arranged on an insulating enclosure, on which, diagonally to the terminal bar, terminal lugs are arranged that protrude from two sides with at least partial openings that are situated across from each other. The machines to be connected can thus be connected to the bus bar from both sides.

However, completely different bus bars are required, depending on which system is to be used. In particular, the system that has terminal lugs arranged on both sides of a vertical terminal bar for aligning machines is extremely inflexible.

SUMMARY OF THE INVENTION

The object of this invention is to provide a bus bar block that has great variability and is flexible to use.

The object of this invention is attained by a bus bar block with the features as claimed. Preferred embodiments and further designs of the invention may be found in the subclaims. According to the invention, the bus bar block is comprised of a first and a second bus bar, with each having one insulating enclosure, which is at least partially opened on one side across from a base side. In each enclosure at least one terminal bar is arranged on which several terminal lugs are arranged such that they protrude in sections from the enclosure through the at least the partially opened side. Such bus bars are generally known from the horizontal assembly. However, according to the invention, however, two such bus bars are arranged on a holding device such that their base areas face each other. The holding device for each terminal bar of one of the two bus bars is comprised of an electro-conductive connection element that is structured such that it can be connected with the terminal lug using a first end section of one of the terminal bars of the first bus bar and with the second end section using the terminal lug of a terminal bar of the second bus bar and thus make a connection to a connecting contact. By means of this holding device it is possible to arrange the known bus bars that have terminal lugs on only one side, such that overall an arrangement is created, in which terminal lugs protrude on two opposite sides, so that a bus bar block for a horizontal assembly with terminal lugs arranged on one side, as well as a bus bar block for the vertical assembly with two terminal lugs arranged on opposite sides may be assembled with one and the same type of bus bar block, according to the building block principle.

Preferably, the connecting contact or the connecting contacts are arranged in the holding device. This allows the bus bar block to be assembled as compactly as possible.

In addition, it is preferable for both bus bars to be assembled identically, which further reduces the necessary number of components.

It is especially advantageous for each of the bus bars to have two, three or four terminal bars, which are arranged in the insulating enclosure, insulated from each other in separate chambers, so that these bus bars can provide the number of different phases needed in one bus bar block.

In accordance with a preferred embodiment of the invention, the connection elements are designed such that their end sections lie flat against the respective terminal lugs when bus bars are mounted on a holding device, in order to generate a contact with as large a surface area as possible and, in particular, good electro-conductive contact.

Preferably, the holding device is designed such that the connection elements can be connected with the terminal lugs of the bus bars, which are arranged in one of the first of the end sections of the bus bar, so that the feed-in at one end of the bus bar block can be arranged where it is easily accessible.

In an advantageous further development of the invention, the holding device has a joining element for each terminal bar of one of the bus bars, which can be connected with a first end section using one of the terminal lugs of one of the terminal bars of the first bus bar and with a second end section using one of the terminal lugs of one of the terminal bars of the second bus bar, which causes the respectively connected terminal bars of the two bus bars to be connected in parallel in the region between the connection elements and the joining elements. This allows more power to feed into the bus bar block.

It is also preferable that the joining elements can be connected using the terminal lugs of the bus bars, which are arranged in a second of the end sections of the bus bars, so that the terminal bars can be connected in parallel over their entire length.

In accordance with a preferred design of the invention, the joining elements are structured as connection elements. Preferably, the holding device thus has two electro-conductive connection elements for each terminal bar of one of the two bus bars, with the two connection elements able to be connected using the terminal lugs of the bus bars which are arranged in the end sections of the bus bars, allowing several bus bar blocks to be connected in series.

In a preferred design of the invention, the holding device has two top-hat rails that are arranged relative to the bus bars in a way that allows mounting connectable devices to the terminal lugs.

In particular, the top-hat rails thereby run essentially parallel to the bus bars.

However, to accommodate the different sizes of the devices, it is especially preferred that each top-hat rail can be variably mounted on a fastening device relative to the bus bars. In particular, every top-hat rail preferably has slot holes for adjusting the distance between the bus bar and the top-hat rail. Furthermore, between each of the top-hat rails and the fastening device there should be at least one, preferably several intermediate elements to adjust the relative height. This allows an especially flexible construction of the bus bar block that can be adjusted easily to the appropriate machine size.

BRIEF DESCRIPTION OF THE DRAWINGS

The invention is explained in detail by means of the following figures. They show FIG. 1a a perspective view, diagonally from the front, of a first embodiment example of the bus bar block according to the invention.

FIG. 1b an enlargement of a section from FIG. 1a.

FIG. 1c another perspective view from diagonally behind the embodiment example in accordance with FIG. 1a.

FIG. 1e a perspective illustration of the electroconducive connections in a first end section of the bus bar block in accordance with FIG. 1a.

FIG. 1f a perspective illustration of the electrical connecting leads in a second end section of the bus bar block in accordance with FIG. 1a.

FIG. 2b an enlargement of a section from FIG. 2a.

FIG. 2c another perspective view from diagonally behind the embodiment example in accordance with FIG. 2a.

FIG. 2e a perspective illustration of the electroconducive connections in a first end section of the bus bar block in accordance with FIG. 2a.

FIG. 2f a perspective illustration of the electrical connecting leads in a second end section of the bus bar block in accordance with FIG. 2a.

FIG. 3b an enlargement of a section from FIG. 3a.

FIG. 3c another perspective view from diagonally behind the embodiment example in accordance with FIG. 3a.

FIG. 3e a perspective view of the electroconducive connections in a first end section of the bus bar block in accordance with FIG. 3a.

FIG. 3f a perspective illustration of the electrical connecting leads in a second end section of the bus bar block in accordance with FIG. 3a.

DETAILED DESCRIPTION OF THE PREFERRED EMBODIMENTS

FIGS. 1a to 1f show different views of the first embodiment example of a bus bar block 10. The same parts are designated with the same reference number. For clarity, not all reference numbers are noted on all figures.

The bus bar block 10 has a first bus bar 20 and a second bus bar 30, which, are essentially designed identical to each other. The bus bars 20, 30 have an insulating enclosure 25, 35, each of which has a base side 25b, 35b and a base side 25a, 35a located across from the base side 25b, 35b, which at least partially has openings. Each of the bus bars 20, 30 has a first terminal bar 21, 31, a second terminal bar 22, 32 and a third terminal bar 23, 33, which are arranged parallel to each other in the enclosure 25, 35 and are insulated from each other in the enclosure 25, 35, for example by being arranged in separate chambers of the enclosure 25, 35. Terminal lugs 26, 27, 28, 36, 37, 38 are arranged on each terminal bar 21, 22, 23, 31, 32, 33 that are spaced lengthwise from each other and that run orthogonally to the respective terminal bar 21, 22, 23, 31, 32, 33 and protrude with their free end from the openings in the sides 25a, 35a of the enclosure 25, 35.

The terminal bars 21, 22, 23 or 31, 32, 33 of the bus bars 20, 30 are arranged parallel to each other, such that the terminal lugs 26, 27, 28, 36, 37, 38 of the terminal bars 21, 22, 23, 31, 32, 33 are each offset differently from each other, so that all terminal lugs 26, 27, 28 of the terminal bars 21, 22, 23 of the first bus bar 20 or all terminal lugs 36, 37, 38 of the terminal bars 31, 32, 33 of the second bus bar 30 lie in a plane. The terminal lugs 26, 27, 28 or 36, 37, 38 of the terminal bars 21, 22, 23 or 31, 32, 33 of the first bus bar 20 or the second bus bar 30 are each arranged at the same distance apart; however, they are offset from each other such that for the terminal lugs 26, 27, 28 or 36, 37, 38 that lie in a plane, every third terminal lug belongs to the same terminal bar.

The two bus bars 20, 30 are mounted to each other by means of a holding device 40 such that their base sides 25b, 35b are facing each other. The holding device 40 has a base plate 40a, on which three supports 41a, 41b, 41c are arranged, on which the two bus bars 20, 30 can be held in place with help from the brackets 42a, 42b, 42c so that the clamps 42a, 42b, 42c can be bolted to the supports 41a, 41b, 41c using screws and the bus bars 20, 30 can be fixed between the clamps 42a, 42b, 42c and the supports 41a, 41b, 41c. This achieves an arrangement in which terminal lugs are arranged lengthwise on two sides, with help from two practically identical bus bars 20, 30, each of which each has terminal lugs 26, 27, 28, 36, 37, 38 only on one side 25a, 35a. Thus, it is no longer necessary to use different parts for the bus bars 20, 30 usually mounted horizontally for one system and the bus bars usually mounted horizontally with two protruding terminal lugs, since the second system can be assembled from two identical bus bars 20, 30 by means of a holding device 40.

Figure 1A:
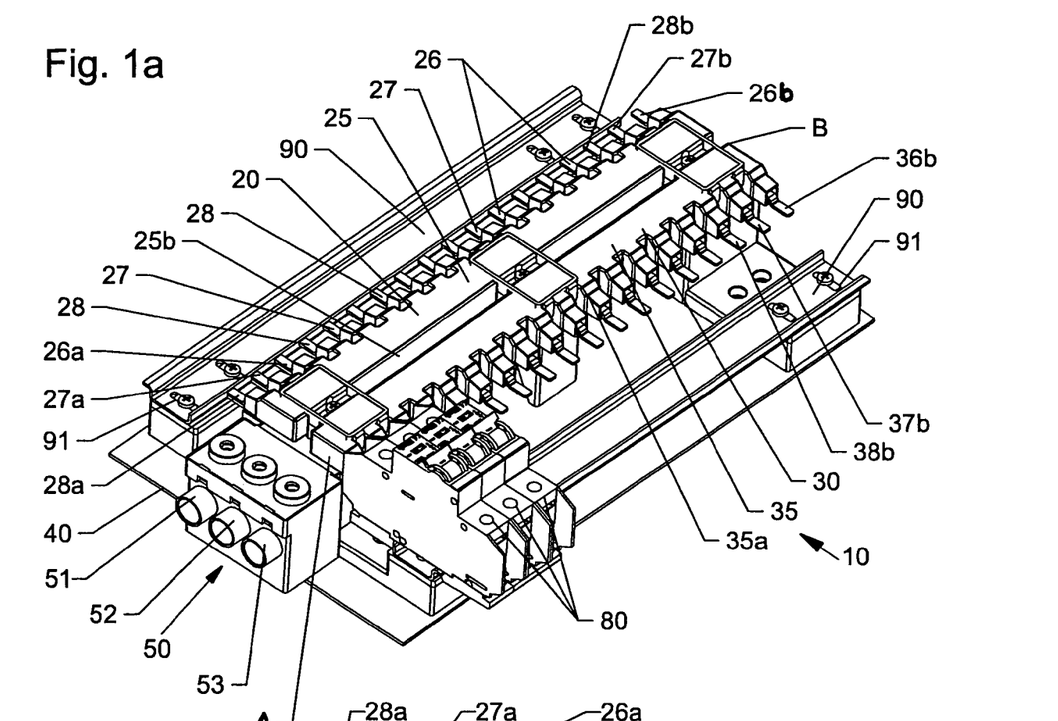
Figure 1B:
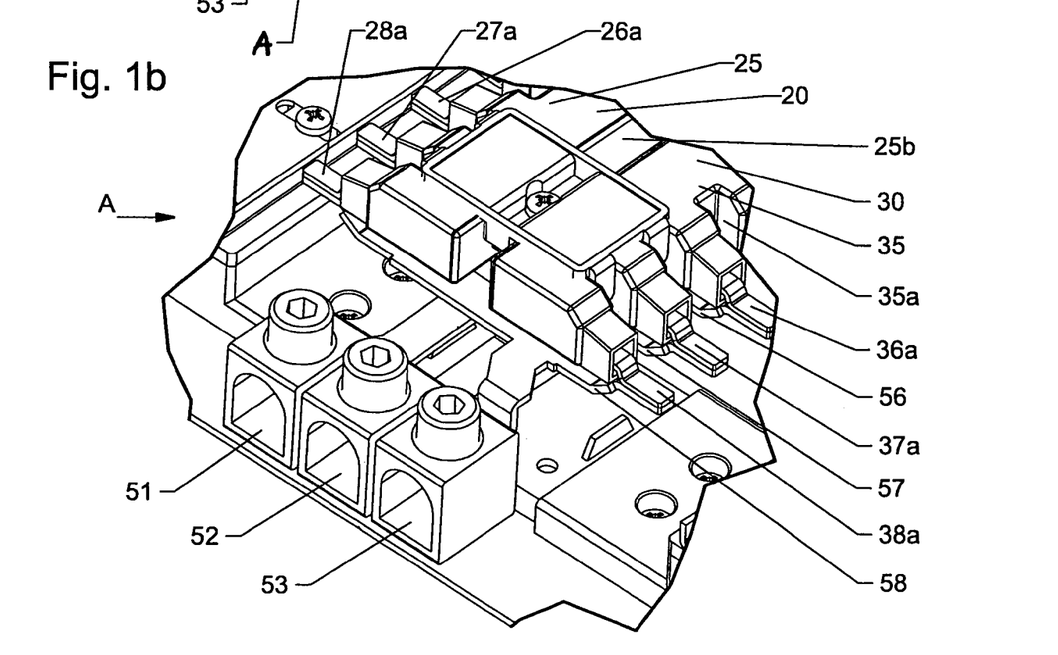
Figure 1C:
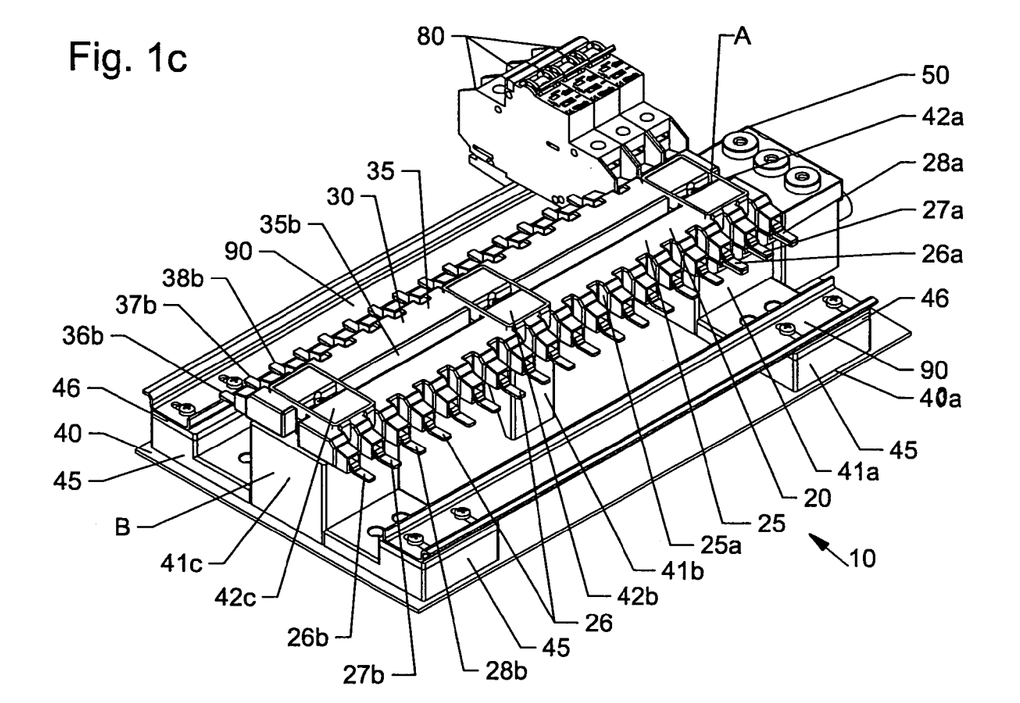
Figure 1D:
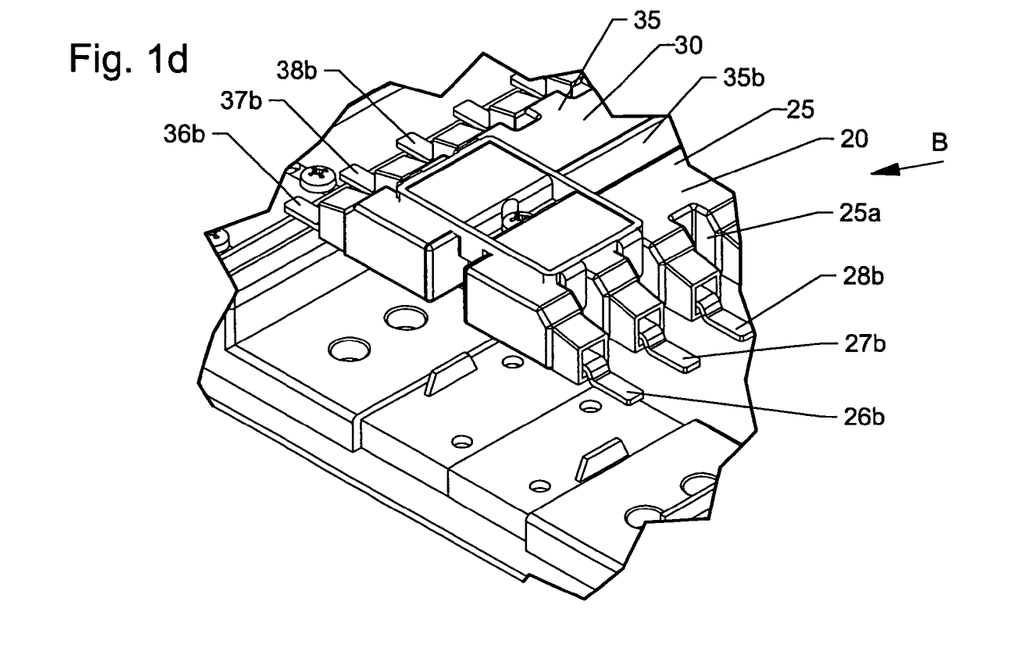
FIG. 1d an enlargement of a section from FIG. 1c.

Parallel to the bus bars 20, 30 and usually offset in height, two top-hat rails 90 are arranged on the side of the bus bars 20, 30 on fastening devices 45, which are primarily designed as a support block to which the top-hat rails 90 can be bolted. Machines 80 can be attached to the top-hat rails 90 such that they make contact with the terminal lugs 26, 27, 28, 36, 37, 38 of the bus bars 20, 30. In order to accommodate the different machine sizes 80, the position of the top-hat rails 90 can be varied relative to the bus bars 20, 30. For this purpose the top-hat rails 90 have slot holes 91, which stretch orthogonal to the longitudinal direction of the top-hat rails 90 and which are used to vary the distance between the longitudinal direction of the top-hat rail 90 and the longitudinal direction of the bus bars 20, 30. Additionally, intermediate elements 46 of different heights may be inserted between the fastening devices 45, designed as support blocks, and the top-hat rails 90, in order to vary the distance between the top-hat rail 90 and the fastening devices 45 or the base plate 40a, which also varies the relative height between the top-hat rail 90 and the bus bars 20, 30. The bus bar block 10 may have variable design, depending on which machines 80 should be connected to the bus bar block 10.

The bus bar block 10 has a first end section A and a second end section B, in which each of the ends of the bus bars 20, 30 are located.

Figure 1E:
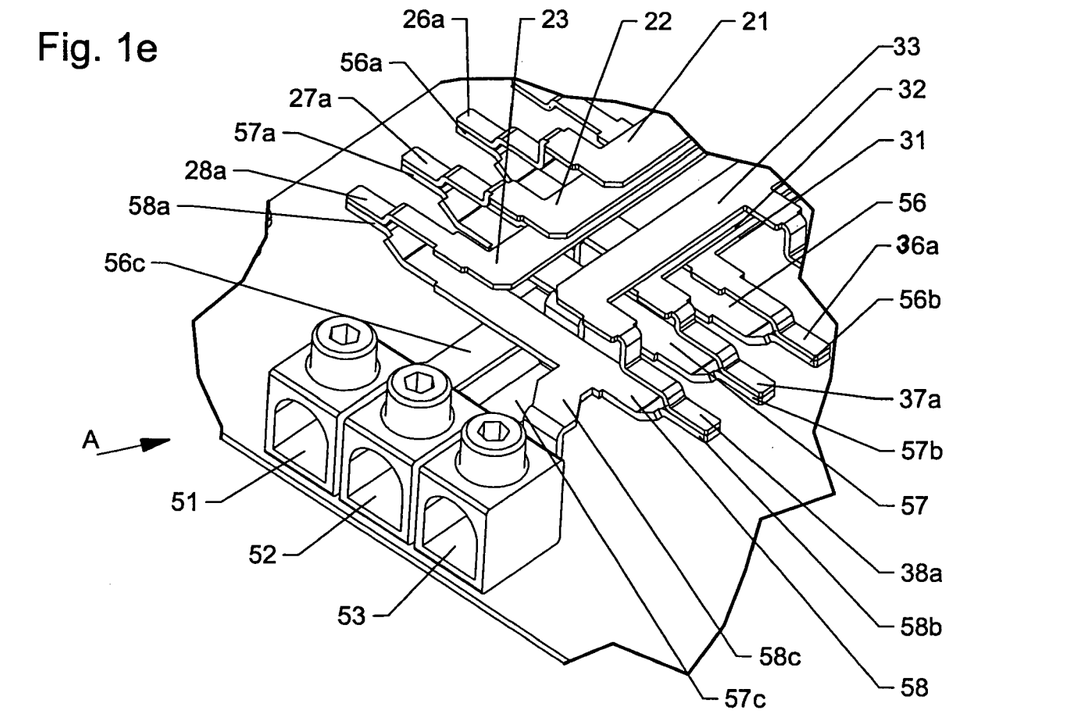

The outer terminal lugs of the terminal bars 21, 22, 23, 31, 32, 33 of the bus bars 20, 30 are located in the end regions A, B. The terminal lugs located in the first end section are designated as follows: the terminal lugs of the first terminal bar 21 of the first bus bar 20 are designated with 26a, the terminal lugs of the second terminal bar 22 of the first bus bar 20 are designated with 27a, the terminal lugs of the third terminal bar 23 of the first bus bar 20 are designated with 28a, the terminal lugs of the first terminal bar 31 of the second bus bar 30 are designated with 36a, the terminal lugs of the second terminal bar 32 of the second bus bar 30 are designated with 37a, and the terminal lugs of the third terminal bar 33 of the second bus bar 30 are designated with 38a.

Figure 1F:
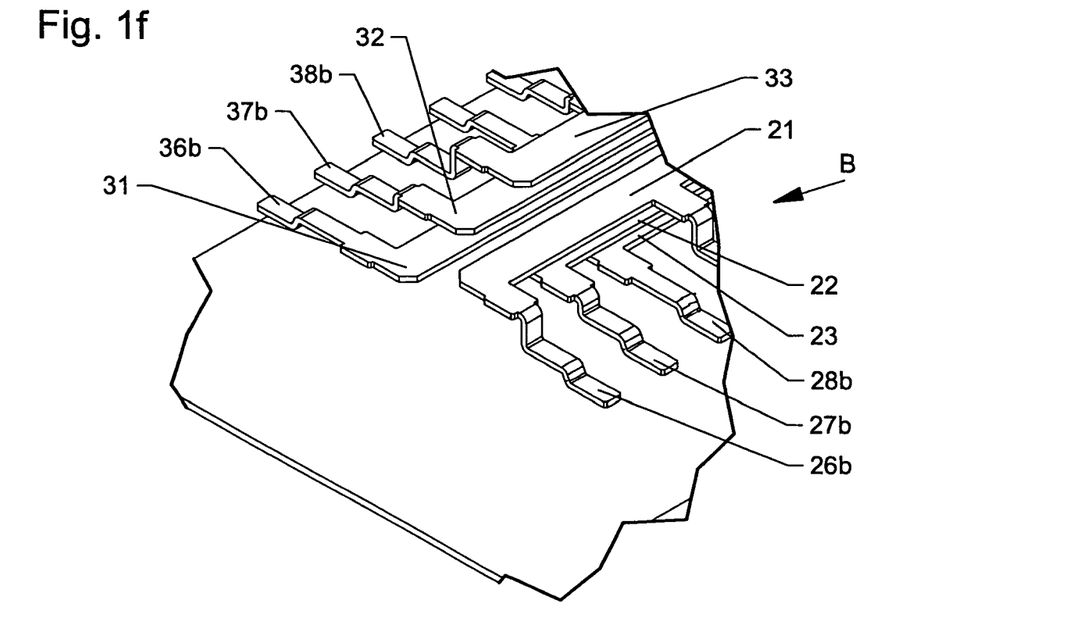

Similarly, the last terminal lugs located in the second end section B of the first terminal bar 21 of the first bus bar 20 are designated with 26b, the terminal lugs of the second terminal bar 22 of the first bus bar 20 are designated with 27b, the terminal lugs of the third terminal bar 23 of the first bus bar 20 are designated with 28b, the terminal lugs of the first terminal bar 31 of the second bus bar 30 are designated with 36b, the terminal lugs of the second terminal bar 32 of the second bus bar 30 are designated with 37b, and the terminal lugs of the third terminal bar 33 of the second bus bar 30 are designated with 38b.

In the first end section A of the bus bar block 10, power or voltage is supplied by means of a feed-in 50 using a first connecting contact 51 for the first two terminal bars 21, 31 of the bus bars 20, 30, using a second connecting contact 52 for the two second terminal bars 22, 32 of the bus bars 20, 30 and a third connecting contact 53 for the two third terminal bars 23, 33 of the bus bars 20, 30. For this purpose a first connection element 56 is provided, which has a first end section 56a, a second end section 56b and a connection 56c. The connection element 56 is approximately T-shaped, with the two end sections 56a, 56b situated at the ends of the cross beam, while the connection 56c forms the main beam. For a mounted bus bar 20, the first end section 56a makes a planar contact with the end section of the terminal lug 26a of the first terminal bar 21, while the second end section 56b, for a mounted second bus bar 30, makes a planar contact with the free end section of the terminal lug 36a of the first terminal bar 31 of the second bus bar 30 and thus creates an electro-conductive connection between the first terminal bar 21 of the first bus bar 20 and the first terminal bar 31 of the second bus bar 30. The connection 56c leads to the first connecting contact 51, which can be used to supply power or voltage to the two first terminal bars 21, 31 of the bus bars 20, 30.

A second connection element 57 with a first end section 57a, a second end section 57b, and a connection 57c similarly connects the second terminal bar 22 of the first bus bar 20 and the second terminal bar 32 of the second bus bar 30 by means of the terminal lugs 27a, 37a, with the connection to the second connecting contact 52 being formed by the connection 57c.

Finally, a third connection element 58 with a first end section 58a, a second end section 58b, [and] a connection 58c connects the third terminal bar 23 of the first bus bar 20 with the third terminal bar 33 of the second bus bar 30 by means of the appropriate terminal lugs 28a, 38a, with the connection to the third connecting contact 53 being formed by the connection.

By means of the connecting contacts 51, 52, 53 of the feed-in 50, the three usual phases can be connected to the bus bar block 10, and by means of the terminal bars 21, 22, 23, 31, 32, 33 respectively, the various machines 80 can be attached. The feed-in 50 preferably has an enclosure, which is arranged on the base plate 40a and, in particular, is a part of the holding device 40. For example, the feed-in 50 may also be integrated in the support 41a.

FIGS. 2a to 2f show different views of a second embodiment example of a bus bar block 10'. The bus bar block 10 is largely identical to the bus bar block 10 illustrated in FIGS. 1a to 1f; therefore, the same parts are designated with the same reference numbers in the figures. However, for clarity, not all reference numbers are noted on all figures.

Figure 2A:
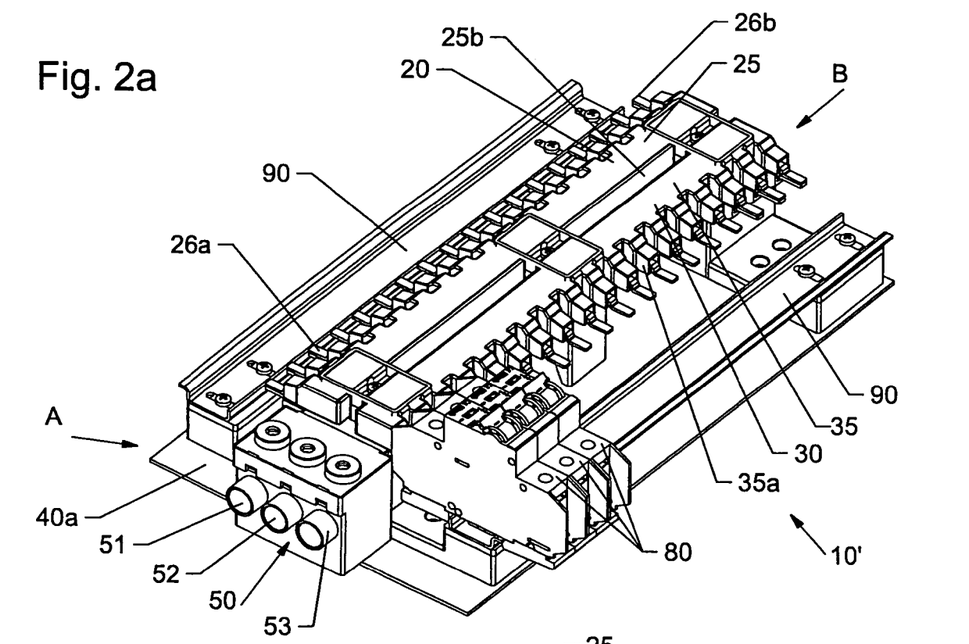
FIG. 2a a perspective view, diagonally from the front, of a second embodiment example of a bus bar block in accordance with the invention.
Figure 2B:
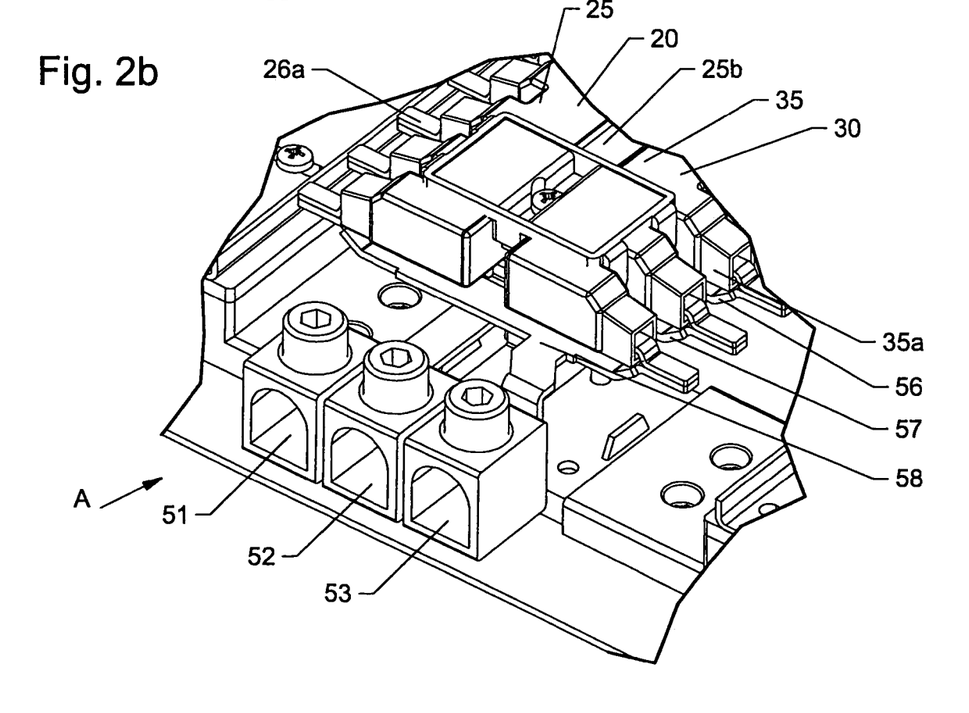
Figure 2C:
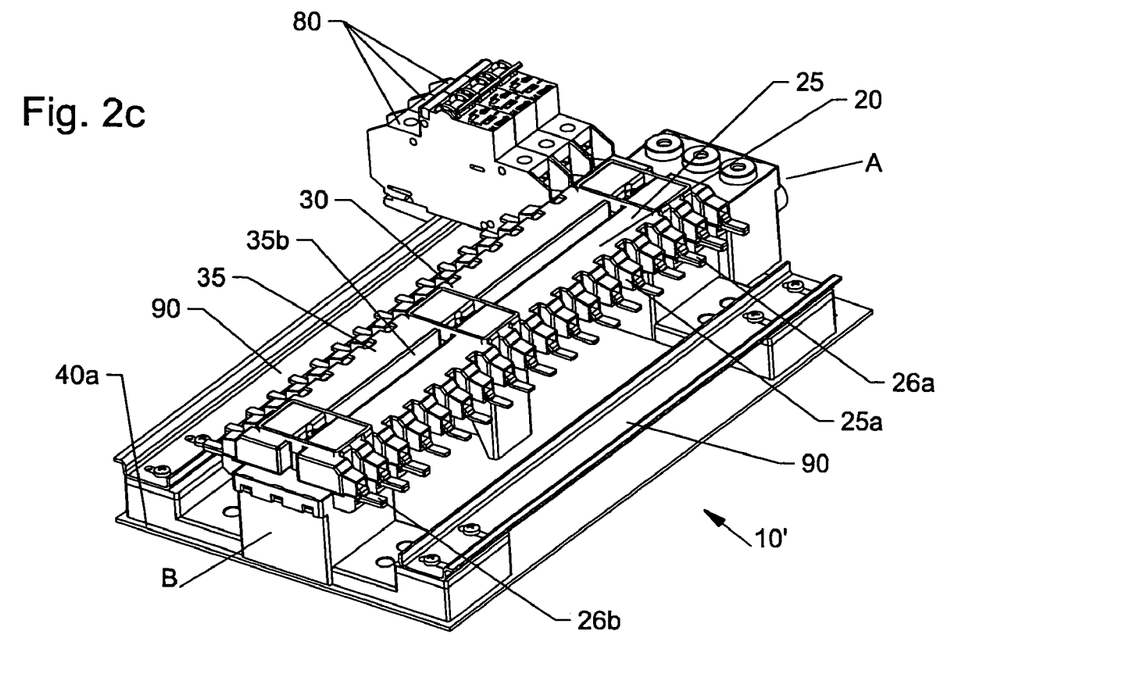
Figure 2D:
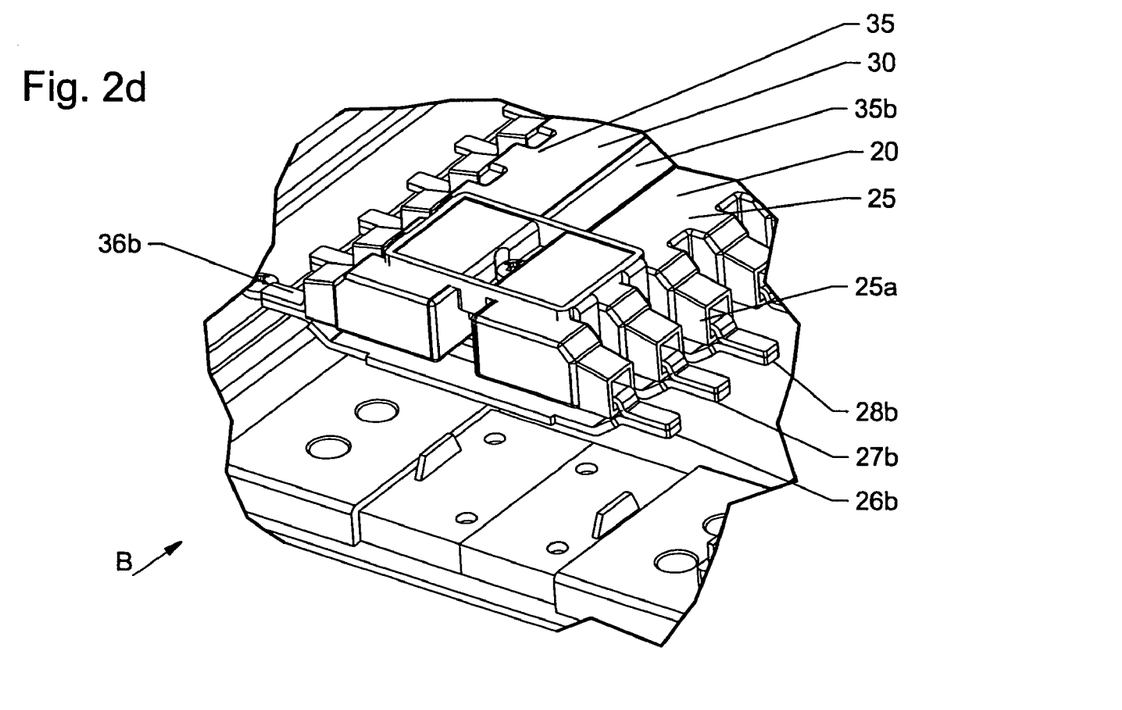
FIG. 2d an enlargement of a section from FIG. 2c.
Figure 2E:
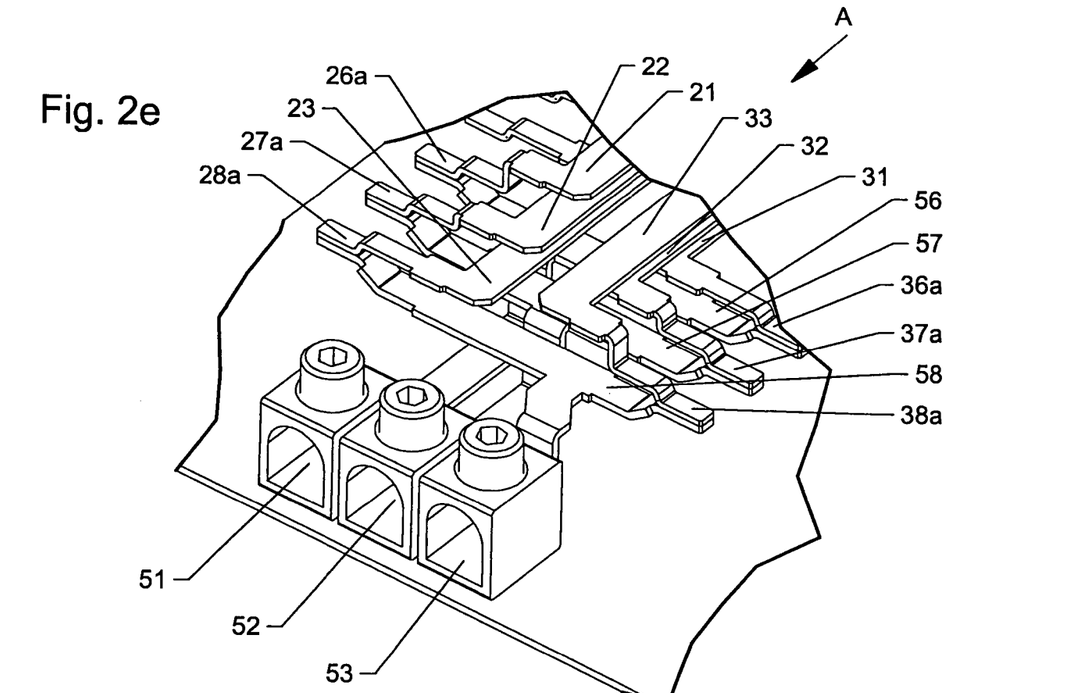
Figure 2F:
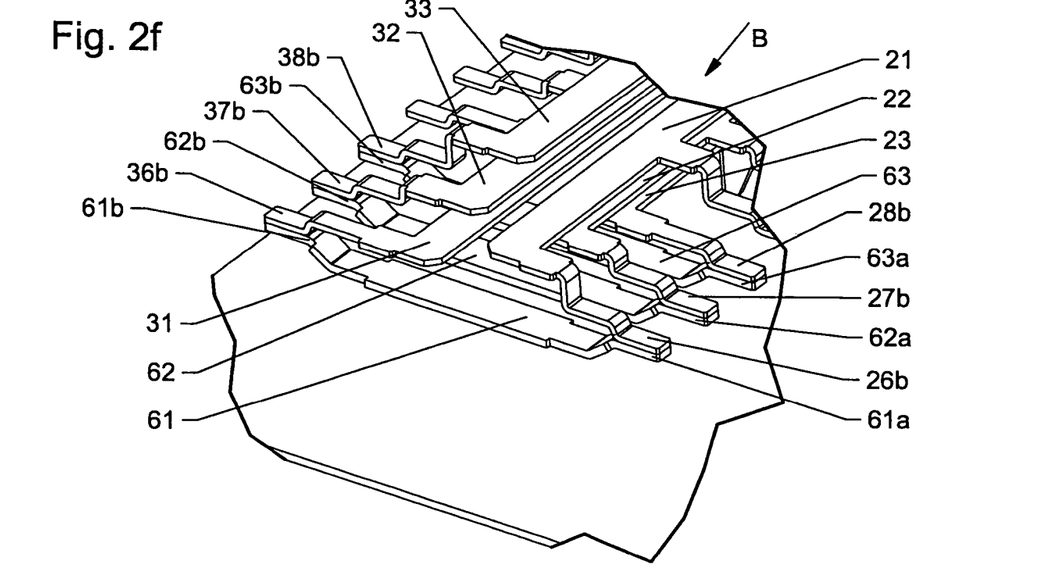

The bus bar block 10' in accordance with the second embodiment example of the invention is different from the bus bar block 10 in accordance with the first embodiment example of the invention merely in the design of the second end section B, in which an additional connection between the respective terminal bars 21, 31 or 22, 32 or 23, 33 of the bus bar block 20, 30 is formed. For this purpose, a first joining element 61 with a first end section 61a and an end section 61b is provided, which, along with the first end section 61a, is in planar contact with the free end section of the terminal lug 26b when the bus bar 20 is mounted, while the second end section 61b is in planar contact with the free end section of the terminal lug 36b when the second bus bar 30 is mounted. This forms an additional electro-conductive connection between the first terminal bar 21 of the first bus bar 20 and the first terminal bar 31 of the second bus bar 30. Similarly, the second terminal bar 22 of the first bus bar 20 is connected with the second terminal bar 32 of the second bus bar 30 by means of a second joining element 62, which has a first end section 62a and a second end section 62b, with the first end section 62a being in contact with the free end section of the terminal lug 27b when the bus bar 20 is mounted, while the second end section 62b is in planar contact with the free end section of the terminal lug 37b when the second bus bar 30 is mounted.

Finally by means of a third joining element 63, an electro-conductive contact is formed between the third terminal bar 23 of the first bus bar 20 and the third terminal bar 33 of the second bus bar 30, such that the third joining element 63 is connected with a first end section 63a at the free end section of the terminal lug 28b and with a second end section 63b at the fee end section of the terminal lug 38b. The respective terminal bars 21, 31 or 22, 32 or 23, 33 of the bus bars 20, 30 are thus connected in parallel by means of the connection elements 56, 57, 58 and the joining elements 61, 62, 63, so that higher voltage can be transferred to the bus bar block 10'.

The FIGS. 3a to 3f show a third embodiment example of a bus bar block 10". The bus bar block 10" in accordance with the third embodiment example of the invention is largely identical to the bus bar block 10 in accordance with the first embodiment example of the invention; therefore the same parts are designated with the same reference numbers. However, for clarity, not all reference numbers are noted on all figures.

Figure 3A:
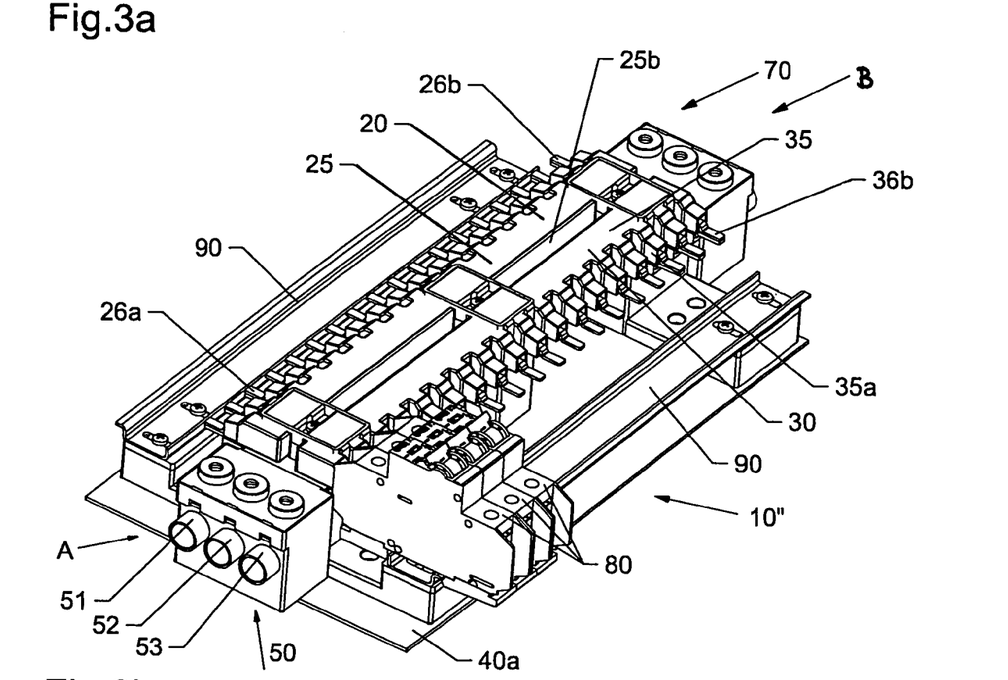
FIG. 3a a perspective view, diagonally from the front, of a third embodiment example of a bus bar block according to the invention.
Figure 3B:
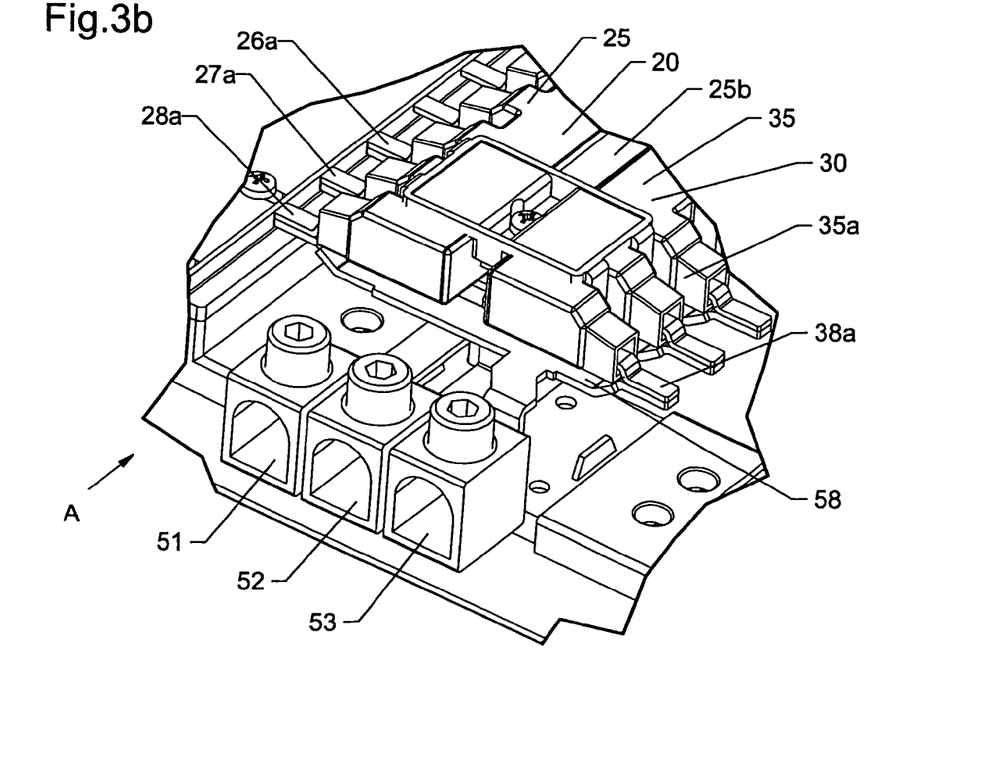
Figure 3C:
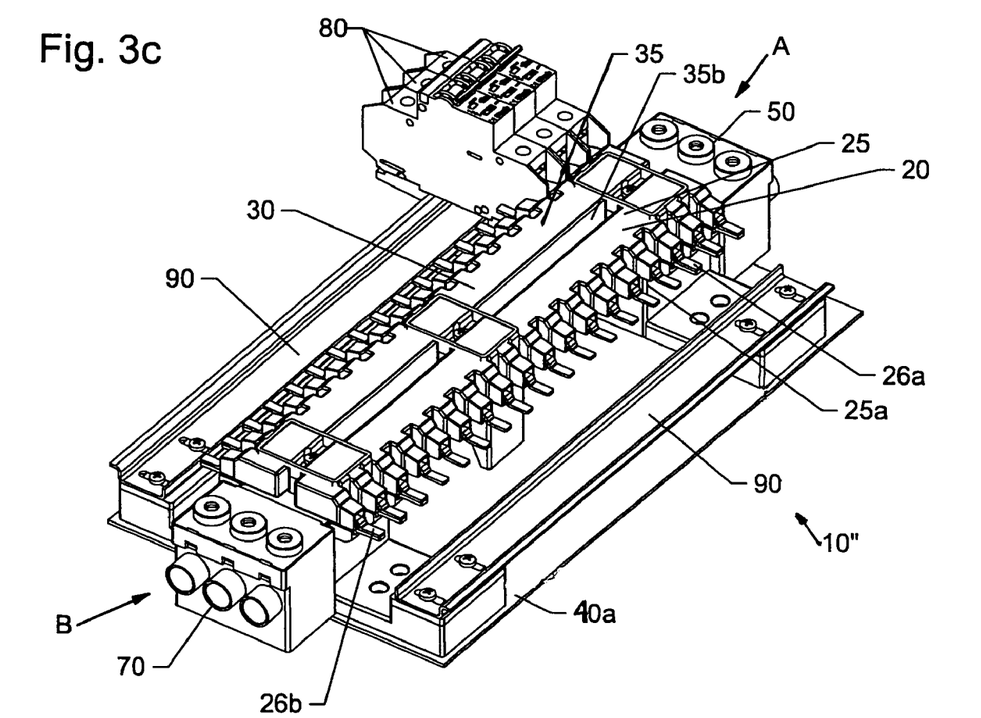
Figure 3D:
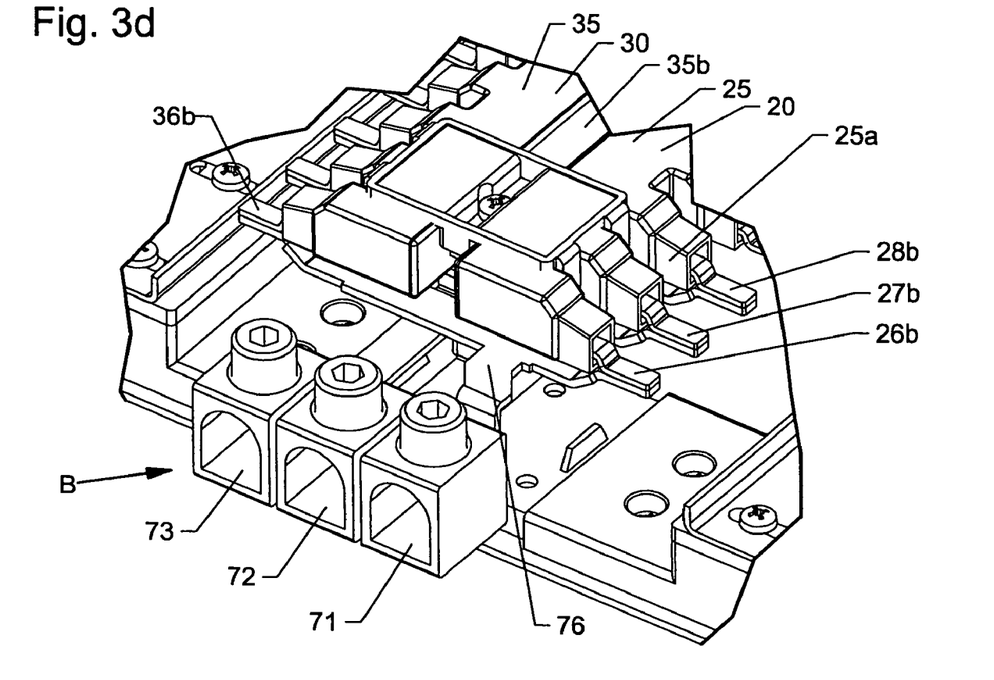
FIG. 3d an enlargement of a section from FIG. 3c.
Figure 3E:
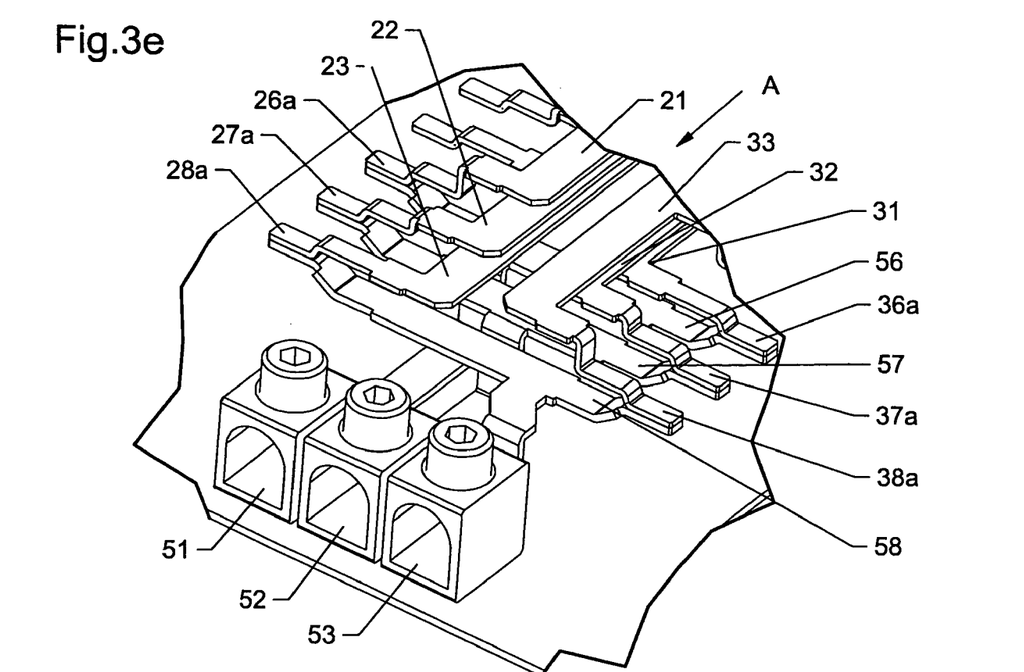
Figure 3F:
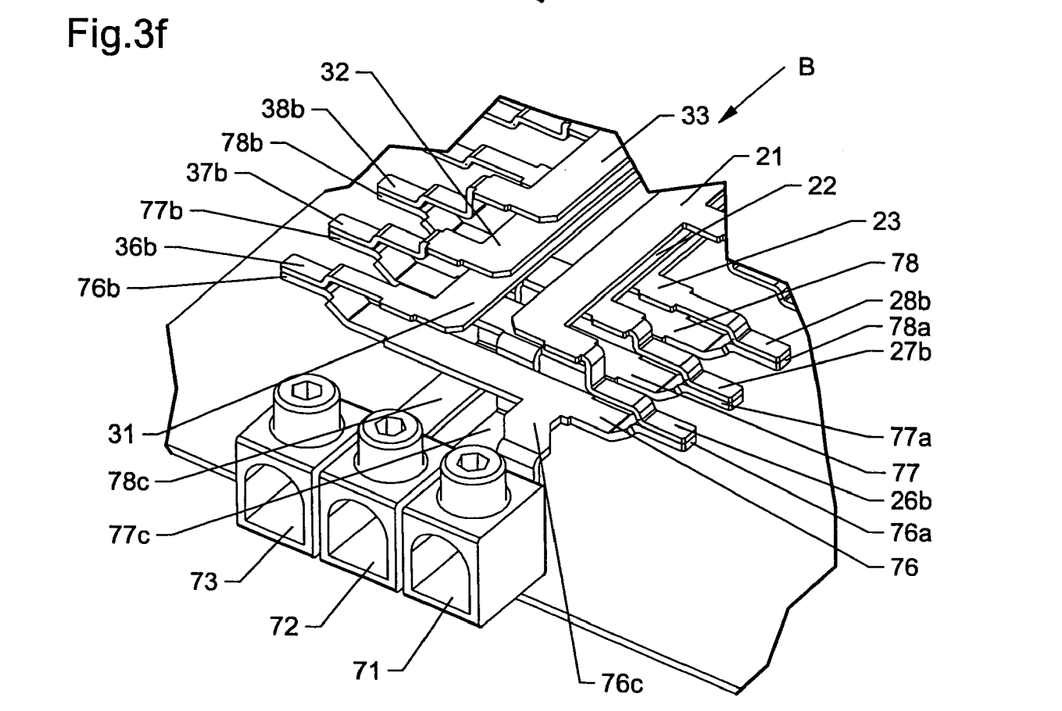

The bus bar block 10" in accordance with the third embodiment example of the invention is different from the bus bar block 10 in accordance with the first embodiment example of the invention in the design of the second end section B, in which a second feed-in 70 is provided with a fourth connecting contact 71, a fifth connecting contact 72, and a sixth connecting contact 73. Comparable to the design in the first end section A, a fourth connection element 76, a fifth connection element 77 and a sixth connection element 78 are provided, which connect the respective terminal bars 21, 31 or 22, 32 or 23, 33 of the bus bars 20, 30 with each other and with the connecting contacts 71, 72, 73. For this purpose, the fourth connection element 76 has a first end section 76a, a second end section 76b and a connection 76c, with the first end section 76a being in contact with the terminal lug 26b of the first terminal bar 21 when the first bus bar 20 is mounted, while the second end section 76b is in contact with the terminal lug 36b of the first terminal bar 31 of the second bus bar 30 when the second bus bar 30 is mounted. By means of the connection 76c, a contact to the fourth connecting contact 71 is formed. Power fed-in over the first connecting contact 51 thus flows across the two first terminal bars 21, 31 of the bus bars 20, 30 up to the fourth connecting contact 71.

The fifth connection element 77 has a first end section 77a, a second end section 77b, and a connection 77c, with the first end section 77a being in contact with the terminal lug 27b of the second terminal bar 22 of the first bus bar 20 and the second end section 77b being in contact with the terminal lug 37b of the second terminal bar 32 of the second bus bar 30. By means of the connection 77c, the terminal bars 22, 32 are connected with the fifth connecting contact 72.

Finally, the sixth connection element 78 has a first end section 78a, a second end section 78b, and a connection 78c, with the first end section 78a being in contact with the terminal lug 28b of the third terminal bar 23 of the first bus bar 20 and the second end section 78b being in contact with the terminal lug 38b of the third terminal bar 33 of the second bus bar 30, and by means of the connection 78c, the terminal bars 23, 33 are connected with the sixth connecting contact 73.

By means of the second feed-in 70, it is thus possible to connect several of such bus bars blocks 10" in a row.

Preferably, the feed-in 70 has an enclosure which is arranged on the base plate 40a and, in particular, is part of the holding device 40. For example, the feed-in 70 may also be integrated into the support 41c.

REFERENCE NUMBER LIST

10 Bus bar block
10' Bus bar block
10" Bus bar block
20 First bus bar
25 Enclosure
25a Side
25b Base side
21 First terminal bar
22 Second terminal bar
23 Third terminal bar
26 Terminal lug
26a Terminal lug
26b Terminal lug
27 Terminal lug
27a Terminal lug
27b Terminal lug
28 Terminal lug
28a Terminal lug
28b Terminal lug
30 Second bus bar
35 Enclosure
35a Side
35b Base side
31 First terminal bar
32 Second terminal bar
33 Third terminal bar
36 Terminal lug
36a Terminal lug
36b Terminal lug
37 Terminal lug
37a Terminal lug
37b Terminal lug
38 Terminal lug
38a Terminal lug
38b Terminal lug
40 Holding device
40a Base plate
41a Support
41b Support
41c Support
42a Clamp
42b Clamp
42c Clamp
45 Fastening device
46 Intermediate element
50 Feed-in
51 First connecting contact
52 Second connecting contact
53 Third connecting contact
56 First connection element
56a First end section
56b Second end section
56c Connection
57 Second connection element
57a First end section
57b Second end section
57c Connection
58 Third connection element
58a First end section
58b Second end section
58c Connection
61 First joining element
61a First end section
61b Second end section
62 Second joining element
62a First end section
62b Second end section
63 Third joining element
63a First end section
63b Second end section
70 Feed-in
71 Fourth connecting contact
72 Fifth connecting contact
73 Sixth connecting contact
76 Fourth connection element
76a First end section
76b Second end section
76c Connection
77 Fifth connection element
77a First end section
77b Second end section
77c Connection
78 Sixth connection element
78a First end section
78b Second end section
78c Connection
80 Machine
90 Top-hat rail
91 Slot hole
A First end section
B Second end section

I claim:

1. A bus bar block comprising: a first bus bar and a second bus bar, each of which has an insulating enclosure, which is at least partially open on one side across from a base side, with, in each enclosure, at least one terminal bar being arranged on which several terminal lugs are arranged such that they protrude from the enclosure in sections through the at least partially open side, with the two bus bars being arranged on a holding device such that their base areas are facing each other, with the holding device for each terminal bar of one of the two bus bars having an electro-conductive connection element, which is connected with a first end section using one of the terminal lugs of a terminal bar of the first bus bar and with a second end section using one of the terminal lugs of a terminal bar of the second bus bar and such that it makes a connection to a connection contact.

2. The bus bar block according to claim 1 further characterized in that the connecting contact or the connecting contacts are arranged in the holding device.

3. The bus bar block according to claim 2 further characterized in that both bus bars are assembled identically.

4. The bus bar block according to claim 3 further characterized in that every bus bar has two, three or four terminal bars, with a separate chamber being provided in the insulating enclosure for each terminal bar.

5. The bus bar block according to claim 4 further characterized in that the connection elements are constructed such that their end regions make planar contact with their respective terminal lugs when a bus bar is mounted on the holding device.

6. The bus bar block according to claim 5 further characterized in that the holding device is designed such that the connection elements can be connected with the terminal lugs of the bus bar, which are arranged in a first end section of the bus bar.

7. The bus bar block according to claim 6 further characterized in that the holding device for each terminal bar of one of the bus bars has a joining element that can be connected with a joining element first end section using one of the terminal lugs of one of the terminal bars of the first bus bar and with a joining element second end section using one of the terminal lugs of one of the terminal bars of the second bus bar.

8. The bus bar block according to claim 7 further characterized in that the joining elements can be connected with the terminal lugs of the bus bars, which are arranged in a second end section.

9. The bus bar block according to claim 8 further characterized in that the holding device for each terminal bar of one the two bus bars has two electro-conductive connection elements, with the two connection elements able to be connected with the terminal lugs of the bus bars, which are arranged in the end sections of the bus bars.

10. The bus bar block according to claim 9 further characterized in that the holding device has two top-hat rails, which are arranged relative to the bus bars such that connectable machines can be mounted to the terminal lugs.

11. The bus bar block according to claim 10 further characterized in that every top-hat rail can be mounted variably on a fastening device relative to the bus bars.

12. The bus bar block according to claim 11 further characterized in that every top-hat rail has slot holes for adjusting the distance between the bus bar and the top-hat rail.

13. The bus bar block according to claim 12 further characterized in that between the top-hat rails and the fastening device there is at least one, preferably several, intermediate elements used to adjust the relative height.

14. The bus bar block according to claim 1 further characterized in that both bus bars are assembled identically.

15. The bus bar block according to claim 1 further characterized in that every bus bar has two, three or four terminal bars, with a separate chamber being provided in the insulating enclosure for each terminal bar.

16. The bus block according to claim 1 further characterized in that the connection elements are constructed such that their end regions make planar contact with their respective terminal lugs when a bus bar is mounted on the holding device.

17. The bus bar block according to claim 1 further characterized in that the holding device is designed such that the connection elements can be connected with the terminal lugs of the bus bar, which are arranged in a first end section of the bus bar.

18. The bus bar block according to claim 1 further characterized in that the holding device for each terminal bar of one of the bus bars has a joining element that can be connected with a first end section using one of the terminal lugs of one of the terminal bars of the first bus bar and with a second end section using one of the terminal lugs of one of the terminal bars of the second bus bar.

19. The bus bar block according to claim 1 further characterized in that the holding device for each terminal bar of one the two bus bars has two electro-conductive connection elements, with the two connection elements able to be connected with the terminal lugs of the bus bars, which are arranged in the end sections of the bus bars.

20. The bus bar block according to claim 1 further characterized in that the holding device has two top-hat rails, which are arranged relative to the bus bars such that connectable machines can be mounted to the terminal lugs.

21. The bus bar block according to claim 20 further characterized in that every top-hat rail can be mounted variably on a fastening device relative to the bus bars.

22. The bus bar block according to claim 21 further characterized in that every top-hat rail has slot holes for adjusting the distance between the bus bar and the top-hat rail.

23. The bus bar block according to claim 21 further characterized in that between the top-hat rails and the fastening device there is at least one, preferably several, intermediate elements used to adjust the relative height.

24. The bus bar block according to claim 2 further characterized in that every bus bar has two, three or four terminal bars, with a separate chamber being provided in the insulating enclosure for each terminal bar.

25. The bus bar block according to claim 2 further characterized in that the connection elements are constructed such that their end regions make planar contact with their respective terminal lugs when a bus bar is mounted on the holding device.

26. The bus bar block according to claim 2 further characterized in that the holding device is designed such that the connection elements can be connected with the terminal lugs of the bus bar, which are arranged in a first end section of the bus bar.

27. The bus bar block according to claim 3 further characterized in that the connection elements are constructed such that their end regions make planar contact with their respective terminal lugs when a bus bar is mounted on the holding device.

28. The bus bar block according to claim 3 further characterized in that the holding device is designed such that the connection elements can be connected with the terminal lugs of the bus bar, which are arranged in a first end section of the bus bar.

29. The bus bar block according to claim 4 further characterized in that the holding device is designed such that the connection elements can be connected with the terminal lugs of the bus bar, which are arranged in a first end section of the bus bar.

30. The bus bar block according to claim 6 further characterized in that the joining elements can be connected with the terminal lugs of the bus bars, which are arranged in a second end section.

31. A bus bar block comprising:
a) a first bus bar and a second bus bar, each of which has an insulating enclosure, which is at least partially open on one side across from a base side, with, in each enclosure, at least one terminal bar being arranged on which several terminal lugs are arranged such that they protrude from the enclosure in sections through the at least partially open side, with the two bus bars being arranged on a holding device such that their base areas are facing each other, with the holding device for each terminal bar of one of the two bus bars having an electro-conductive connection element, which is connected with a first end section using one of the terminal lugs of a terminal bar of the first bus bar and with a second end section using one of the terminal lugs of a terminal bar of the second bus bar and such that it makes a connection to a connection contact;

b) wherein the connecting contact or the connecting contacts are arranged in the holding device;

c) two top-hat rails on the holding device, which are arranged relative to the bus bars such that connectable machines can be mounted to the terminal lugs; and d) means to variably mount every top-hat rail on a fastening device relative to the bus bars.

* * * * *